US010034428B2

(12) United States Patent
Cook et al.

(10) Patent No.: US 10,034,428 B2
(45) Date of Patent: Jul. 31, 2018

(54) AGRICULTURAL HEADER WITH CUTTER TRACKING REEL

(71) Applicant: CNH Industrial America LLC, New Holland, PA (US)

(72) Inventors: Joel T. Cook, Lititz, PA (US); Joshua S. Joyce, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/285,982

(22) Filed: Oct. 5, 2016

(65) Prior Publication Data
US 2018/0092305 A1    Apr. 5, 2018

(51) Int. Cl.
| | |
|---|---|
| *A01D 57/04* | (2006.01) |
| *A01D 57/02* | (2006.01) |
| *A01D 34/28* | (2006.01) |
| *A01D 69/03* | (2006.01) |
| *A01D 101/00* | (2006.01) |

(52) U.S. Cl.
CPC ......... *A01D 57/025* (2013.01); *A01D 34/286* (2013.01); *A01D 69/03* (2013.01); *A01D 2101/00* (2013.01)

(58) Field of Classification Search
CPC ...... A01D 41/141; A01D 57/04; A01D 41/14; A01D 41/148; A01D 57/02
USPC .......................................................... 56/221
See application file for complete search history.

(56) References Cited

U.S. PATENT DOCUMENTS

| | | | | |
|---|---|---|---|---|
| 2,795,920 A | * | 6/1957 | Steuerwald ............ | A01D 57/04 403/107 |
| 2,873,567 A | * | 2/1959 | Vogelaar ................ | A01D 57/04 56/221 |
| 3,347,029 A | * | 10/1967 | Grinwald ............... | A01D 44/00 56/297 |
| 3,623,301 A | * | 11/1971 | Hofer ..................... | A01B 63/10 56/10.4 |
| 4,011,709 A | * | 3/1977 | Mott .................... | A01D 41/148 56/10.4 |

(Continued)

FOREIGN PATENT DOCUMENTS

| | | |
|---|---|---|
| GB | 2 195 873 A | 4/1988 |
| WO | 2014025346 A1 | 2/2014 |

OTHER PUBLICATIONS

European Search Report for European Application No. 17194688.2, dated Mar. 8, 2018 (4 pages).

*Primary Examiner* — Arpad Fabian-Kovacs
(74) *Attorney, Agent, or Firm* — Peter K. Zacharias; Patrick M. Sheldrake (57) ABSTRACT

An agricultural vehicle includes a chassis and a header carried by the chassis. The header includes: a header frame; a cutter movably coupled to the header frame; a reel arm pivotably coupled to the header frame; a reel carried by the reel arm and including a plurality of tines; a variable displacement fluid cylinder including an interior chamber, a first piston linked to the reel arm placed within the interior chamber and a second piston placed within the interior chamber, the interior chamber defining a shared volume between the first piston and the second piston; and a piston driver linked to the cutter and configured to translate movement of the cutter relative to the header frame into displacement of the second piston within the interior chamber.

20 Claims, 7 Drawing Sheets

(56) References Cited

U.S. PATENT DOCUMENTS

| | | | | |
|---|---|---|---|---|
| 4,124,970 A | * | 11/1978 | Bernhardt | A01D 41/141 56/10.2 E |
| 4,204,383 A | | 5/1980 | Milliken, Jr. | |
| 4,444,000 A | * | 4/1984 | Enzmann | A01D 41/16 56/14.6 |
| 4,641,490 A | * | 2/1987 | Wynn | A01D 41/145 56/10.2 E |
| 4,655,031 A | * | 4/1987 | Kucera | A01D 57/04 56/11.9 |
| 4,800,711 A | | 1/1989 | Hurlburt et al. | |
| 5,261,216 A | * | 11/1993 | Schumacher, II | A01D 41/14 56/14.4 |
| 5,711,140 A | * | 1/1998 | Burmann | A01D 41/148 56/14.4 |
| 5,752,372 A | | 5/1998 | Buermann | |
| 5,832,705 A | * | 11/1998 | Eis | A01B 59/06 56/14.9 |
| 7,730,707 B2 | | 6/2010 | Pietricola et al. | |
| 7,802,417 B2 | * | 9/2010 | Sauerwein | A01D 41/14 56/181 |
| 7,866,132 B2 | | 1/2011 | Killen et al. | |
| 7,992,374 B1 | * | 8/2011 | Bich | A01D 41/141 56/208 |
| 2009/0107094 A1 | | 4/2009 | Bich et al. | |
| 2010/0011728 A1 | * | 1/2010 | Pietricola | A01D 41/148 56/14.4 |
| 2010/0293914 A1 | * | 11/2010 | Killen | A01D 57/04 56/128 |
| 2011/0005184 A1 | * | 1/2011 | Conrad | A01D 41/148 56/181 |
| 2014/0295922 A1 | * | 10/2014 | Buermann | A01D 41/141 460/1 |

\* cited by examiner

AGRICULTURAL HEADER WITH CUTTER TRACKING REEL

FIELD OF THE INVENTION

The present invention relates to agricultural headers, and, more particularly, to agricultural headers with adjustable position cutters.

BACKGROUND OF THE INVENTION

Typically, a header for a harvesting machine includes a cutterbar which is operable to cut standing crop as the machine moves forward and a rotatable reel which carries tines to engage the standing crop and sweep it towards the cutterbar for cutting and then carry the cut material towards an auger before releasing it. The auger usually consolidates the cut crop material centrally of the header before it is passed to the body of the machine for processing. The distance between the cutterbar and the auger can depend on the type and condition of the crop to be harvested. Therefore, some header types have been provided with a cutterbar mounted to a forwardly extendable cutting table, enabling the operator of the harvesting machine to adapt its configuration when the crop condition or type changes.

When harvesting down crops, i.e., crops that are not standing in a normal upright position, the relationships between the reel, the cutterbar and the auger can be important and, in general, the reel should be disposed so that the path described by the outer ends of the tines first enters the down crop forwardly of the cutterbar and below the level thereof for lifting the crop, then sweep closely over the cutterbar and finally pass in close proximity along the auger.

Headers are known in which the cutterbar is vertically flexible along its length so that it can follow local irregularities in the ground. With such headers, it is necessary to be able to adjust the height of the reel relative to the highest point of the cutterbar at any given instant, otherwise the cutterbar is likely to foul the reel on flexing with consequential damage to one or both components. To this end, headers having flexible cutterbars have been fitted with means for automatically adjusting the position of the reel on vertical flexure of the cutterbar.

Similar problems may occur when the cutterbar of an extendable header is set to a forwardmost position. Then the cutterbar will enter into the reel path that is required otherwise for harvesting down crops with a retracted cutting table. The tines or the bars of the reel may then damage the cutterbar or vice versa. Measures must be taken to prevent such interference and limit the path of the reel tines when the header is extended.

One solution to these problems that has been incorporated in Varifeed™ headers sold by New Holland is to incorporate a cam system which adjusts the vertical position of the reel arm. The system includes a cylinder which is linked to the reel arm and has a cam follower in contact with a cam that moves with the cutterbar. As the cutterbar moves in the fore-to-aft direction, the cam moves and contact with the cam follower causes the cam follower to adjust the position of the cylinder, and thus the position of the reel arm. Such a system is effective in single span reels, but has not been found particularly effective in larger headers incorporating split reels which have multiple reel sections connected to multiple cylinders by multiple reel arms.

One particular problem of known systems in split reel headers is coordinating movement of the reel arms together in response to fore-to-aft movement of the cutterbar. Typically, a split reel will be supported at both lateral ends and at the center of the reel by reel arms. The cylinder linked to the center of the re& is not able to be controlled by the cam system described above, while the lateral end cylinders are. Further, while electronically controlling the cylinders has shown promise in coordinating movement of the reel arms, such a system is prone to system lag or malfunction if a fault develops in the wiring.

What is needed in the art is a reliable way to adjust the position of a single span or split reel responsively to fore-to-aft movement of the cutterbar.

SUMMARY OF THE INVENTION

In accordance with an aspect of the present invention, there is provided a header with a reel carried by a reel arm which is adjusted by fluid movement in a closed fluid system caused by movement of a cutter.

In accordance with another aspect of the present invention, there is provided an agricultural vehicle including a chassis and a header carried by the chassis. The header includes: a header frame; a cutter movably coupled to the header frame; a reel arm pivotably coupled to the header frame; a reel carried by the reel arm and including a plurality of tines; a variable displacement fluid cylinder including an interior chamber, a first piston linked to the reel arm placed within the interior chamber and a second piston placed within the interior chamber, the interior chamber defining a shared volume between the first piston and the second piston; and a piston driver linked to the cutter and configured to translate movement of the cutter relative to the header frame into displacement of the second piston within the interior chamber.

In accordance with yet another aspect of the present invention, there is provided an agricultural vehicle including a chassis and a header carried by the chassis. The header includes: a header frame; a cutter movably coupled to the header frame and configured to move in a fore-to-aft direction; a reel arm pivotably coupled to the header frame; a reel carried by the reel arm and including a plurality of tines; and a variable displacement fluid cylinder including a first piston linked to the reel arm; a second piston linked to the cutter; and a shared volume of fluid between the first piston and the second piston, the second piston being linked to the cutter such that movement of the cutter relative to the header frame displaces the second piston and the first piston and causes pivoting of the reel arm.

In accordance with yet another aspect of the present invention, there is provided a method of controlling a reel carried by a reel arm of an agricultural vehicle with respect to a position of a cutter, including: controllably moving the cutter, the cutter moving causing a displacement of a second piston within a variable displacement fluid cylinder; and displacing a first piston which is within the variable displacement fluid cylinder and is linked to the reel arm, the displacing being caused by a shared volume of fluid between the first piston and the second piston acting on the first piston responsively to the displacement of the second piston.

An advantage of the agricultural vehicle described herein is that controlling the position of the reel relative to the cutter by displacement of the second piston linked to movement of the cutter provides a solution which can be easily scaled to simultaneously control the position of one or more reel sections of the reel.

Another advantage of the agricultural vehicle described herein is that movement of fluid in the cylinder to adjust positioning of the reel displays virtually no lag and is not prone to malfunction caused by faulty electrical wiring.

Still another advantage of the agricultural vehicle described herein is that the second piston can be linked to the cutter using either a mechanical or a fluid connection to control displacement of the second piston, providing a variety of options to control the reel relative to the cutter.

Still another advantage of the agricultural vehicle described herein is the position of the reel relative to the ground can be adjusted for crop condition changes by adjusting the shared volume while still allowing the system to maintain the same relative positioning between the cutter and the reel when the cutter moves.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
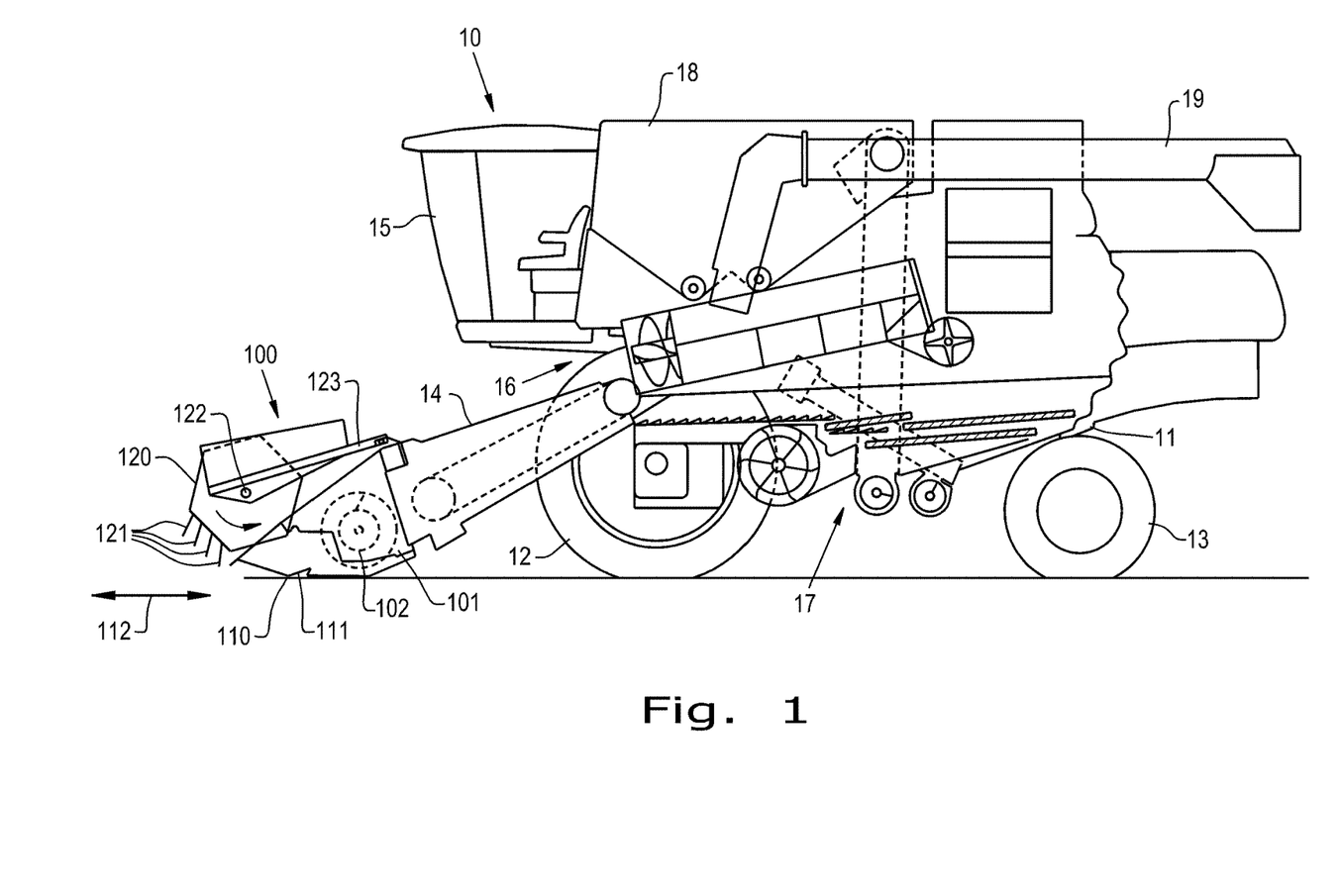
FIG. 1 is a side view of an agricultural vehicle formed in accordance with an exemplary embodiment of the present invention.

Referring now to the drawings, and more particularly to FIG. 1, there is shown an exemplary embodiment of an agricultural vehicle in the form of a combine 10, which generally includes a chassis 11, ground engaging wheels 12 and 13, a header 100, a feeder housing 14, an operator cab 15, a threshing and separating system 16, a cleaning system 17, a grain tank 18, and an unloading auger 19.

Although the agricultural vehicle is shown in the form of a combine harvester, it is also to be understood that the vehicle can take other forms. For example, the vehicle can also be in the form of other types of self-propelled harvesters with headers, such as self-propelled windrowers, forage harvesters, sugarcane harvesters, cotton pickers, etc.

Header 100 is mounted to the front of the combine 10 and includes a cutter 110, shown in FIG. 1 as a flexible cutter bar, for severing crops from a field during forward motion of combine 10. A rotatable reel 120 feeds the crop toward the cutter bar 110, and a double auger 102 feeds the severed crop laterally inwardly from each side toward feeder housing 14. Feeder housing 14 conveys the cut crop to threshing and separating system 16, and is selectively vertically movable using appropriate actuators, such as hydraulic cylinders (not shown).

The header 100 includes a header frame 101 which is carried by the chassis 11 and is coupled to both the cutter bar 110 and the reel 120. The cutter bar 110 is movably coupled to the header frame 101 by, for example, an extendable cutter bar table 111 which is linked to an actuator and allows the cutter bar 110 to move in a fore-to-aft direction, signified by arrow 112. An example of a construction that can be used to movably couple the cutter bar 110 to the header frame 101 using an extendable cutter bar table 111 is described by U.S. Pat. No. 7,730,707, which is incorporated herein by reference, but it should be appreciated that any suitable way of movably coupling the cutter bar 110 to the header frame 101 can be used in accordance with embodiments of the present invention. By movably coupling the cutter bar 110 to the header frame 101, a user can adjust the fore-to-aft position of the cutter bar 110 which will cut crops as the combine 10 traverses a field.

The reel 120, as shown, includes a plurality of tines 121 that will grab crop material and direct it toward the cutter bar 110 as the reel 120 rotates about a reel axis of rotation 122. To adjust the relative positioning of the reel 120 relative to the header frame 101, the reel 120 is pivotably coupled to the header frame 101 by a reel arm 123 which carries the reel 120. In this sense, the reel arm 123 is pivotably coupled to the header frame 101 so forces acting on the reel arm 123 can cause the reel arm 123, and carried reel 120, to pivot about an arm pivot axis, which is omitted from view, as is known in the art.

Figure 2:
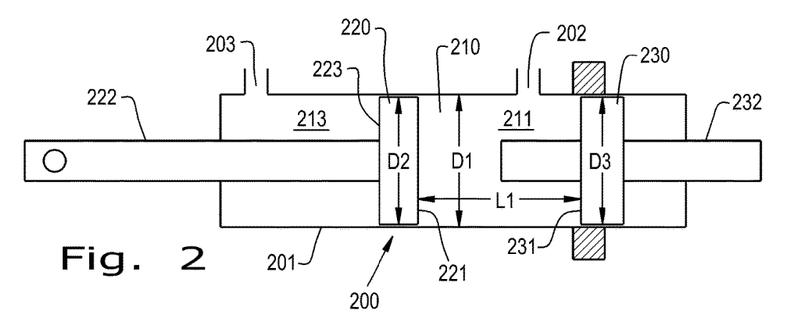
FIG. 2 is a cross-sectional view of a cylinder formed in accordance with an exemplary embodiment of the present invention.

Referring now to FIG. 2, an exemplary embodiment of a variable displacement fluid cylinder 200 formed according to the present invention is shown which includes a cylinder housing 201 having an interior chamber 210 bounded by interior walls of the cylinder housing 201, a first piston 220 placed within the interior chamber 210, and a second piston 230 placed within the interior chamber 210. As can be seen, the cylinder 200 can be formed as a hydraulic cylinder having a cylindrical interior chamber 210 with a chamber diameter D1, with the first piston 220 and second piston 230 both having circular cross-sections of equal piston diameters D2 and D3 which are substantially equal to the chamber diameter D1. In such a configuration, the interior chamber 210 defines a shared volume 211 between the first piston 220 and second piston 230, which can be filled with a force-transmitting fluid acting on both a first side 221 of the first piston 220 and a first side 231 of the second piston 230. As used herein, the volume 211 between the first piston 220 and second piston 230 is "shared" in the sense that when a sufficient amount of fluid (liquid and/or gas) occupies the volume 211, the occupying fluid can act on both the first piston 220 and second piston 230, which will be described further herein. The occupying fluid can be, for example, a common hydraulic fluid such as oil which is non-compressible. The shared volume 211 can be filled with occupying fluid through a port 202 formed in the cylinder housing 201 which connects to a fluid supply 510 (shown in FIG. 5) carried by the vehicle 10, with the fluid supply 510 being able to provide fluid to or drain fluid from the interior chamber 210 to increase or decrease, respectively, the shared volume 211. The relative displacement L1 between the first piston 220 and second piston 230 can also be changed by a user to adjust the relative positioning between the cutter bar 110 and the reel 120 by adjusting the shared volume 211 as previously described. This allows the user to adjust the relative height of the reel 120 relative to the ground by adjusting the shared volume 211. To maintain consistent force-transmitting properties of the fluid occupying the shared volume 211, the amount of fluid in the shared volume 211 can be held constant during operation of the header 100 so a relative displacement L1 between the first piston 220 and second piston 230 remains constant, the significance of which will be described further herein.

The first piston 220 can be connected to a first piston rod 222 which extends out of the cylinder housing 201 and moves as the first piston 220 is displaced within the interior chamber 210. The first piston rod 222 can connect to the reel arm 123 so the first piston 220 is linked to the reel arm 123 such that displacement of the first piston 220 acts on the reel arm 123 to cause pivoting of the reel arm 123 relative to the header frame 101. In this sense, the pivoting position of the reel arm 123 can be controlled by controlling the position of the first piston 220 within the interior chamber 210, and the position of the reel arm 123 and carried reel 120 can be adjusted by displacing the first piston 220 within the interior chamber 210. The interior chamber 210 can also include a first piston volume 213 on a second side 223 of the piston 220 which is opposite the shared volume 211. The first piston volume 213 can be filled with force-transmitting fluid, with the cylinder housing 201 also having a slave port 203 fluidly coupled to the first piston volume 213 of the interior chamber 210, the significance of which will be described further herein. As the first piston volume 213 is bounded by interior walls of the interior chamber 210 on the second side 223 of the first piston 220, the first piston volume 213 can vary based on the position of the first piston 220 within the interior chamber 210, the significance of which is also described further herein. Similarly, the second piston 230 can be connected to a second piston rod 232 linking the second piston 230 to the cutter bar 110, which is further described herein.

Figure 3:
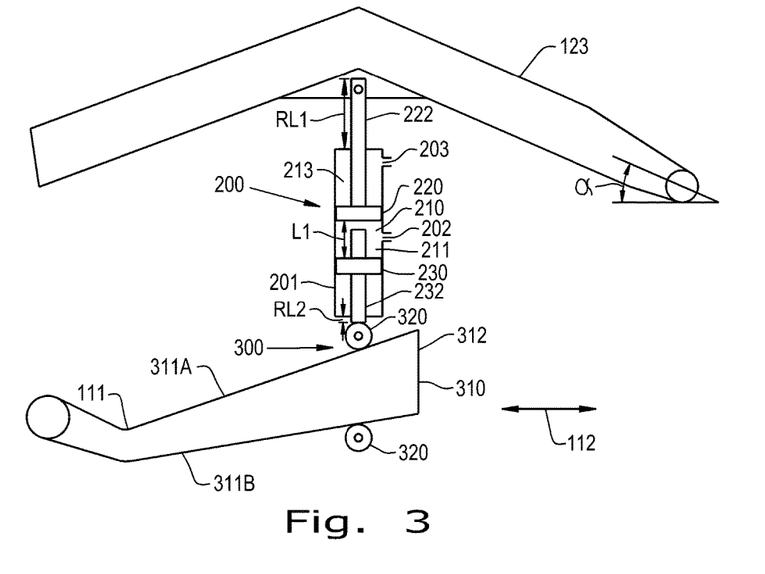
FIG. 3 is a cross-sectional view of the cylinder shown in FIG. 2 when a cutter of the vehicle shown in FIG. 1 is extended.

Referring now to FIG. 3, the cylinder 200 is shown with the first piston 220 linked to the reel arm 123 by the first piston rod 222 and the second piston 230 linked to the cutter bar 110 by the second piston rod 232 and a piston driver 300 shown as a cam system. The cam system 300 can include a cam 310 which is connected to the cutter bar table 111 so the cam 310 moves in the fore-to-aft direction 112 with the cutter bar table 111 and cutter bar 110. As can be seen, the cam 310 can have a pair of cam surfaces 311A, 311B which are angled with respect to the fore-to-aft direction 112, i.e., non-parallel to the fore-to-aft direction 112, such that the cam surfaces 311A, 311B have varying vertical positions in the fore-to-aft direction 112. The cam system 300 can also include one or more cam followers 320 which are connected to the second piston rod 232 and in contact with the cam surfaces 311A, 311B so that as the cam 310 moves in the fore-to-aft direction 112 with the cutter bar 110, the cam followers 320 move along the cam surfaces 311A, 311B and translate this movement into displacement of the second piston 230 within the interior chamber 210. As shown in FIG. 3, the cam followers 320 are adjacent to a proximal end 312 of the cam 310, corresponding to the cutter bar 110 being extended outwardly from the header frame 101, with a corresponding position of the second piston 230 and first piston 220 within the interior chamber 210 of the cylinder 200. As further shown in FIG. 3, the first piston rod 222 connected to the first piston 220 has a first exposed rod length RL1 when the first piston 220 is in the position shown and the second piston rod 232 connected to the cam followers 320 has a second exposed rod length RL2 when the second piston 230 is in the position shown. When the cylinder 200 is statically mounted relative to the header frame 101, the relative values of the exposed rod lengths RL1 and RL2 correlate to a pivot angle a of the reel arm 123 relative to its mounting point to the header frame 101, with the pivot angle a of the reel arm 123 controlling the relative position of the reel 120 relative to the cutter bar 110. Thus, a change in the exposed rod lengths RL1 and RL2 of the first piston rod 222 and second piston rod 232, respectively, changes the relative position of the reel 120 relative to the cutter bar 110.

Figure 4:
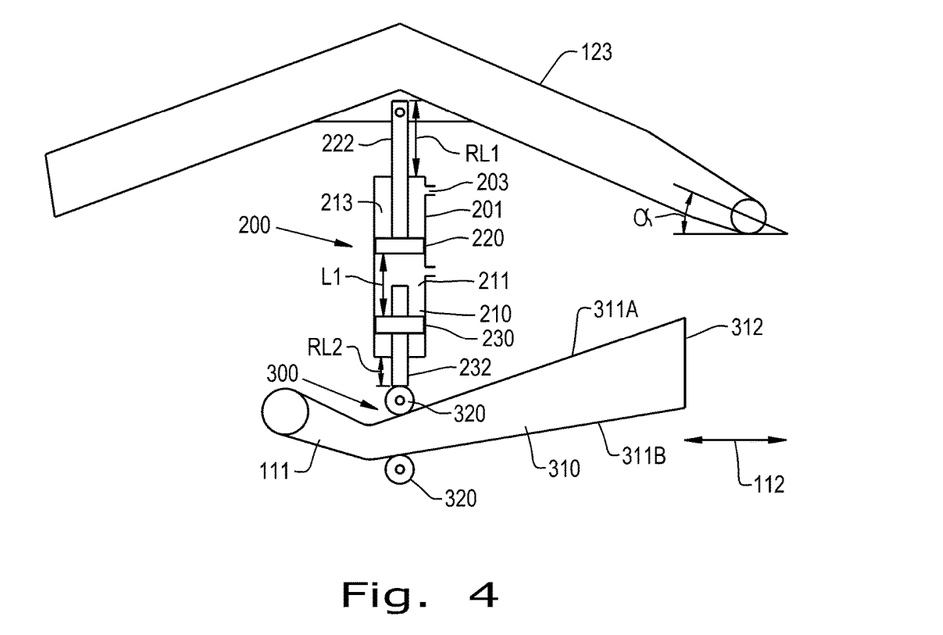
FIG. 4 is a cross-sectional view of the cylinder system shown in FIG. 3 when the cutter is retracted.

Referring now to FIG. 4, such a change in the exposed rod lengths RL1 and RL2 of the first piston rod 222 and second piston rod 232, respectively, is shown. As can be seen, the cam 310 has been moved in the fore-to-aft direction 112 with the cutter bar table 111 and cutter bar 110, corresponding to the cutter bar 110 being retracted, such that the cam followers 320 have moved along the cam surfaces 311A, 311B to a lower vertical position, pulling the second piston rod 232 (and the connected second piston 230) down and increasing the exposed second rod length RL2. Since the cylinder 200 is part of a closed fluid system 500 (shown in FIG. 5) and the shared volume 211 is held constant so the relative displacement L1 between the first piston 220 and second piston 230 is constant, displacement of the second piston 230 from the position shown in FIG. 3 to the position shown in FIG. 4 also displaces the first piston 220 in the same direction that the second piston 230 is displaced to maintain the constant relative displacement L1, which can be seen by comparing the positions of the first piston 220 within the interior chamber 210 in FIGS. 3 and 4. Thus, when the exposed second rod length RL2 of the second piston rod 232 increases due to the cam followers 320 following the cam surfaces 311A, 311B as the cutter bar 110 is retracted, the exposed first rod length RL1 of the second piston rod 222 decreases and pulls the reel arm 123 down in the direction of the displacement of the second piston 230. It should thus be appreciated that the configuration of the cylinder 200 having the shared volume 211 between the first piston 220 and second piston 230, when occupied by force-transmitting fluid, allows movement of the cutter bar 110 in the fore-to-aft direction 112 to adjust the position of the reel 120 relative to the cutter bar 110.

Figure 5:
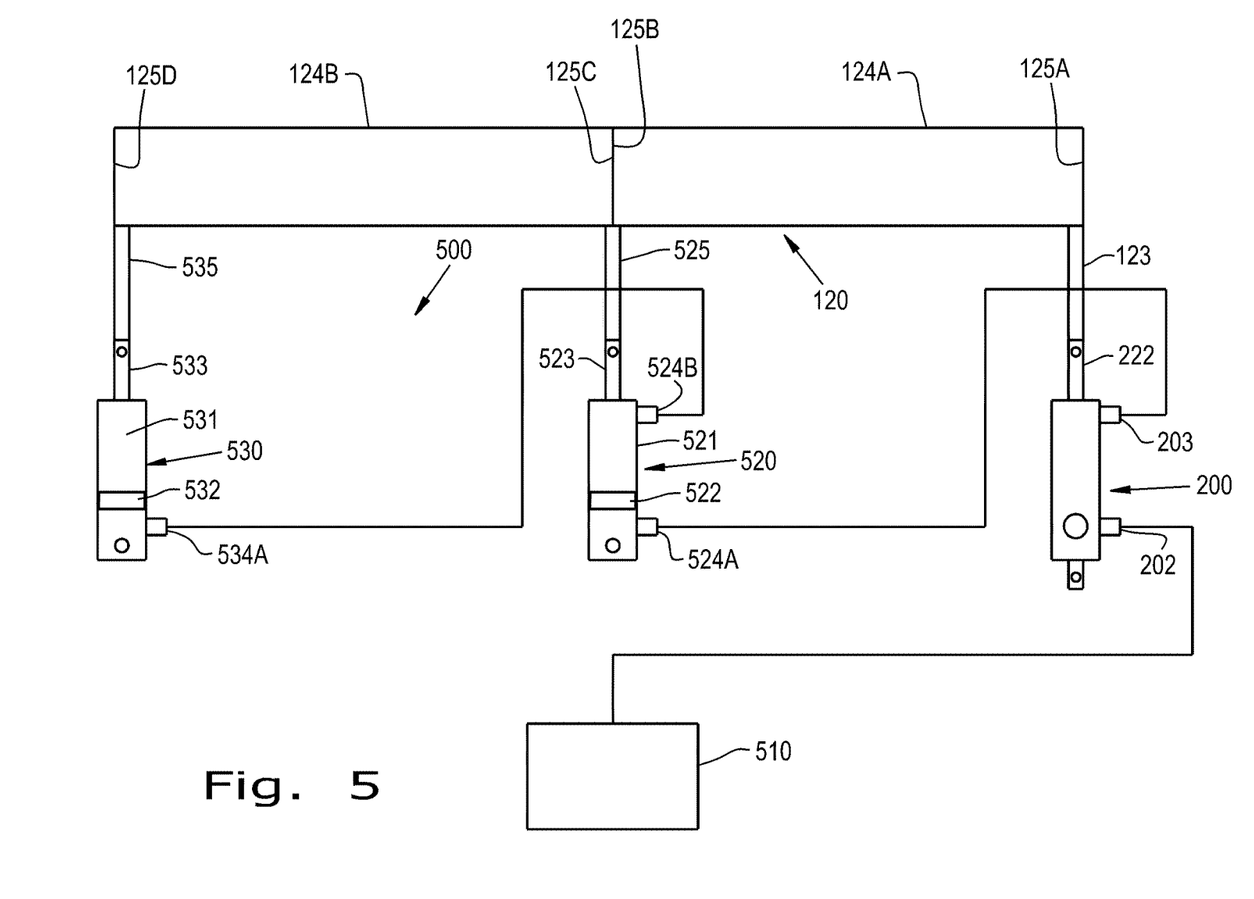
FIG. 5 is a schematic diagram of a closed fluid system including the cylinder shown in FIG. 2 linked to additional cylinders in accordance with an exemplary embodiment of the present invention

To illustrate the significance of the above-described configuration in the context of a split reel system, reference is now made to FIG. 5. As can be seen, the reel 120 can be split into two reel sections 124A, 124B having reel ends 125A, 125B, 125C, and 125D with the cylinder 200 linked to reel end 125A by the reel arm 123. To coordinate the positioning of the reel sections 124A and 124B, the vehicle 10 can include a closed fluid system 500 including one or more additional cylinders 520 and 530 which are driven by the cylinder 200 in a master-slave cylinder relationship. In this sense, the additional cylinders 520 and 530 can be referred to as slave cylinders and the cylinder 200 can be referred to as a master cylinder. Each slave cylinder 520, 530 can include an interior fluid chamber 521, 531 with a piston 522, 532 placed within the interior fluid chamber 521, 531. As can be seen, the piston 522 is linked to both reel end 125B of reel section 124A and reel end 125C of reel section 120B by a piston rod 523 and reel arm 525 which supports both reel ends 125B and 125C while the piston 532 is linked to the reel end 125D by a piston rod 533 and reel arm 535 which supports reel end 125D. The slave cylinder 520 can have a first port 524A and a second port 524B fluidly coupled to the interior fluid chamber 521 while the slave cylinder 530 only has a single port 534A fluidly coupled to the interior fluid chamber 531.

The slave port 203 of the cylinder 200 can be plumbed to the first port 524A of the slave cylinder 520 and the second port 524B of the slave cylinder 520 can be plumbed to the single port 534A of the slave cylinder 530 to form the closed fluid system 500, with the total volume of fluid in the closed fluid system 500 being held constant during operation. Since the total volume of fluid in the closed fluid system 500 is held constant, displacement of the first piston 220 within the interior chamber 210 displaces some or all of the fluid in the first piston volume 213, with the displaced fluid causing the pistons 522, 532 to similarly displace within their respective interior fluid chamber 521, 531. It should thus be appreciated that the displacement of the first piston 220 of the master cylinder 200 causes similar displacement of the pistons 522, 532 of the slave cylinders 520, 530, allowing the master cylinder 200 to simultaneously control the position of the two reel sections 120A and 120B relative to the cutter bar 110. Since the flow of fluid through the closed fluid system 500 responds near instantaneously to mechanical forces, there is virtually no lag in adjusting the positions of the reel sections 120A and 120B responsively to movement of the cutter bar 110 in the fore-to-aft direction 112, ensuring that the reel sections 120A and 120B properly move as the cutter bar 110 moves in the fore-to-aft direction 112. It should be appreciated that while all of the cylinders 200, 520, 530 together are collectively referred to as a closed fluid system herein due to the constant volume of fluid within the system 500, one of the cylinders, such as the master cylinder 200, can also be configured as a closed fluid system in an exemplary embodiment of the present invention; in the case of the master cylinder 200, plugging, sealing, or otherwise obstructing the slave port 203 could allow the master cylinder 200 to function as a closed fluid system.

Figure 6:
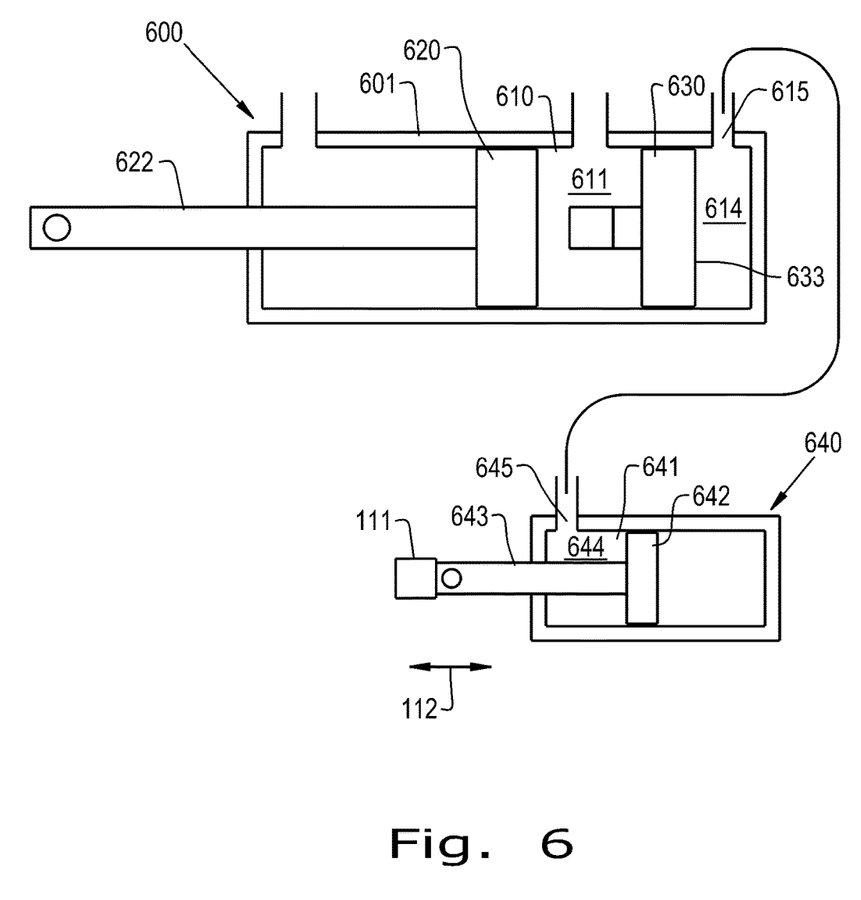
FIG. 6 is a cross-sectional view of another closed fluid system formed in accordance with an exemplary embodiment of the present invention.
Figure 7:
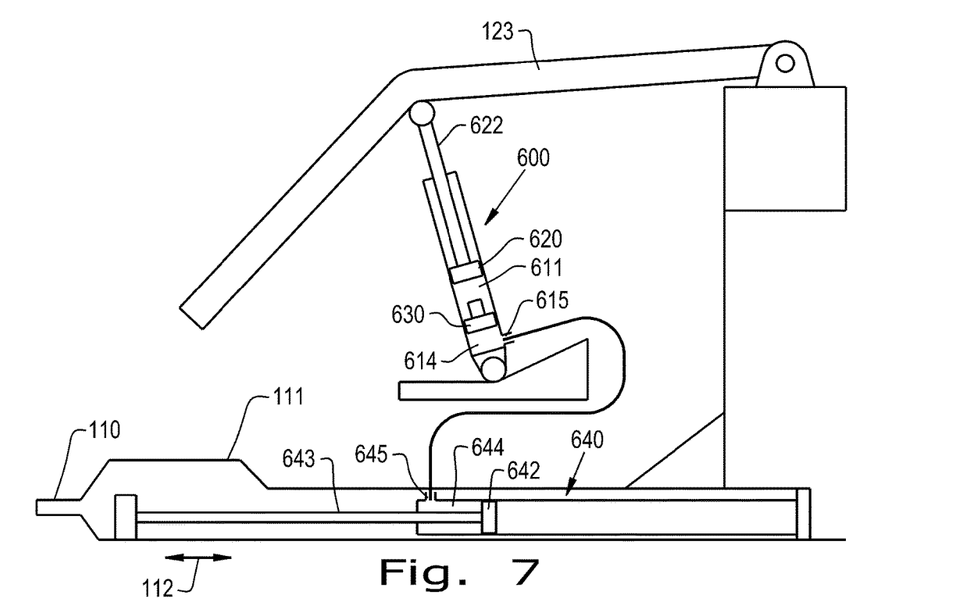
FIG. 7 is a cross-sectional view of the closed fluid system shown in FIG. 6 when a cutter of the vehicle shown in FIG. 1 is extended.
Figure 8:
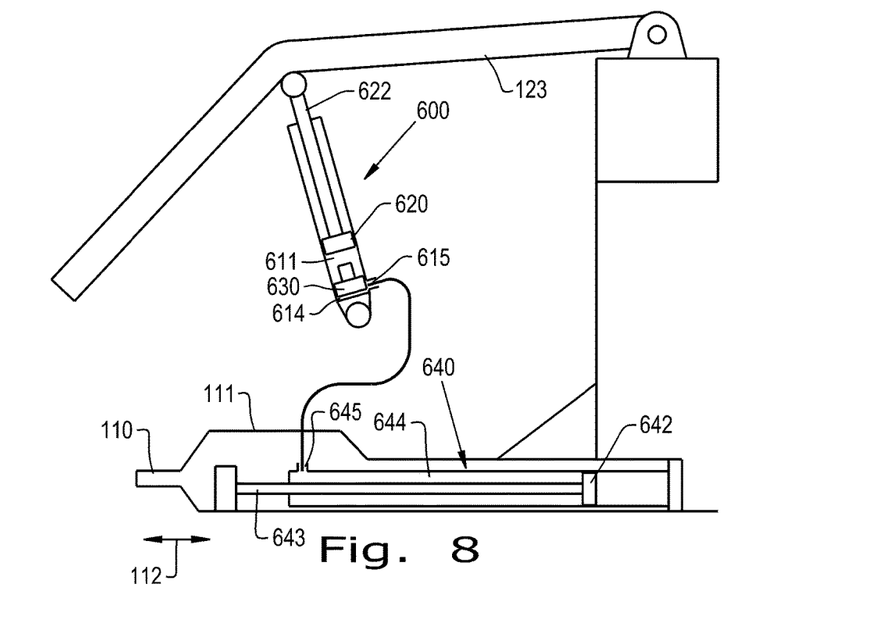
FIG. 8 is a cross-sectional view of the closed fluid system shown in FIG. 6 when the cutter is retracted.

In another exemplary embodiment of the present invention, and referring now to FIGS. 6-8, an alternative cylinder 600 can be used in place of the previously described cylinder 200. For convenience of description, all of the elements of the cylinder 600 which are similar to an element of the cylinder 200 are assigned the same reference numeral raised by 400. As can be seen, the cylinder 600 includes a cylinder housing 601 with an interior chamber 610 and a first piston 620 and a second piston 630 placed in the interior chamber 610 having a shared volume 611 between the first piston 620 and second piston 630. The first piston 620 can also have a piston rod 622 linking the first piston 620 to the reel arm 123, similarly to previously described first piston 220. Unlike the cylinder 200, however, the interior chamber 610 of the cylinder 600 has a second piston volume 614 on a second side 633 of the second piston 630 opposite the shared volume 611 which is fluidly coupled to an activating port 615 formed in the cylinder housing 601 so the second piston 630 is linked to the cutter bar 110 by a piston driver 640 shown as an activating cylinder. The activating cylinder 640 has an activating interior chamber 641 with an activating piston 642 which is placed in the activating interior chamber 641 and can be linked to the cutter bar 110 by an activating piston rod 643 connected to the cutter bar table 111. The activating interior chamber 641 can have an activating volume 644 which is fluidly coupled to a driving port 645 plumbed to the activating port 615 of the cylinder 600 so displacement of the activating piston 642 within the activating interior chamber 641 causes displacement of the second piston 630 within the interior chamber 610. The activating cylinder 640 can be the cylinder which is activated to move the cutter bar table 111 and connected cutter bar 110 in the fore-to-aft direction 112, or be a cylinder that is only utilized to displace the second piston 630 within the interior chamber 610.

Referring specifically now to FIGS. 7 and 8, it can be seen how displacement of the activating piston 642 causes displacement of the second piston 630, and thus displacement of the first piston 620 and adjustment of the position of the reel 120 relative to the cutter bar 110. As shown in FIG. 7, when the cutter bar 110 is extended outwardly, the activating volume 644 of the activating interior chamber 641 decreases, displacing the fluid in the activating volume 644 into the second piston volume 614 of the cylinder 600 and causing a corresponding displacement of the second piston 630 and first piston 620 which raises the reel arm 123 and carried reel 120 relative to the cutter bar 110. When the cutter bar table 111 and cutter bar 110 are moved in the fore-to-aft direction 112 so the cutter bar 110 is retracted, the activating volume 644 of the activating interior chamber 641 increases, displacing the fluid in the second piston volume 614 into the activating volume 644 and causing a corresponding displacement of the second piston 630 and first piston 620 which lowers the reel arm 123 and carried reel 120 relative to the cutter bar 110. It should thus be appreciated that the second piston 630 is still linked to the cutter bar 110, but the link is caused by the shared volume of fluid acting on the second piston 630 and activating piston 642 rather than the mechanical piston driver 300 shown in FIGS. 3-4, i.e., the piston driver described herein can be a mechanical linkage, a fluid circuit, or a combination of a mechanical linkage and a fluid circuit. It should be further appreciated that the second piston can be linked to the cutter bar 110 in a variety of different ways such that movement of the cutter bar 110 in the fore-to-aft direction 112 causes displacement of the second piston within the interior chamber, and that the exemplary embodiments shown and described herein are only some of the possible ways this link can be formed. It should be further appreciated that the previously described exemplary embodiments of the present invention allow a user to control the position of the reel 120 relative to the cutter bar 110 both independently of and dependently on movement of the cutter bar 110, i.e., the user can adjust the position of the reel 120 relative to the ground by adjusting the shared volume without affecting the ability to maintain the relative position between the reel 120 and the cutter bar 110.

Figure 9:
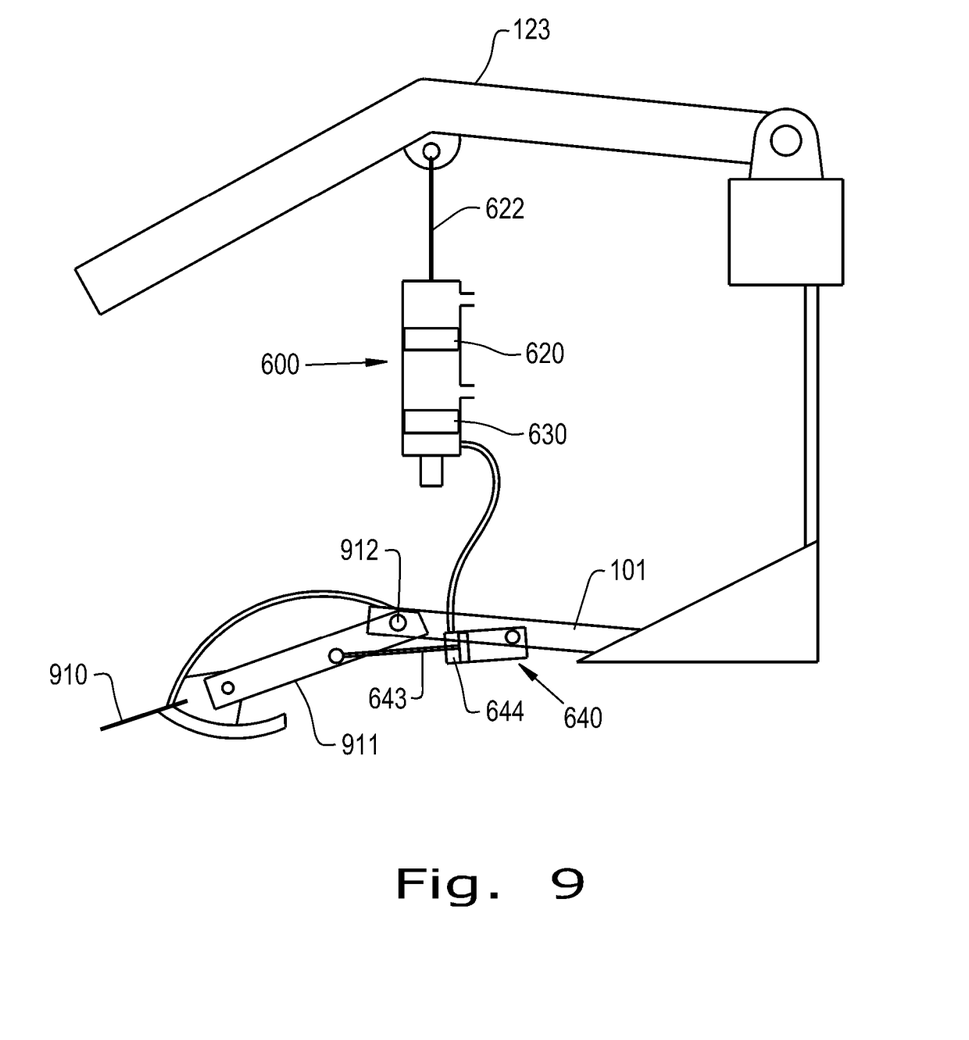
FIG. 9 is a side view of yet another exemplary embodiment of the present invention incorporating a cutter carried by a flex arm.

While the previously described exemplary embodiments of the present invention include a cutter bar 110 which is movably coupled to the header frame 101 by an extendable cutter bar table 111 to controllably move the cutter bar 110 in the fore-to-aft direction 112, other types of movements of the cutter bar 110 can cause adjustment of the position of the reel 120 relative to the cutter bar 110 according to the present invention. In one such exemplary embodiment, and referring now to FIG. 9, a cutter bar 910 that is movably coupled to the header frame 101 by a flex arm 911, rather than an extendable cutter bar table, is shown. As can be seen, the flex arm 911 is pivotably coupled to the header frame 101 at a pivot 912 which defines an axis of rotation of the flex arm 911. The second piston 630 of the cylinder 600 can be linked to the activating cylinder 640 previously described, with the activating piston rod 643 linked to the flex arm 911 such that pivoting movement of the flex arm 911 and connected cutter bar 910 about the pivot axis 912 causes displacement of fluid in the activating volume 644 and a corresponding displacement of the second piston 630 and first piston 620 within the interior chamber 610 of the cylinder 600. For example, the activating piston rod 643 can be linked to the flex arm 911 in a manner that displaces fluid from the activating volume 644 into the second piston volume 614 when the flex arm 911 and cutter bar 910 flex vertically upward about the pivot axis 912 so the second piston 630 and first piston 620 displace within the interior chamber 610 and raise the reel arm 123 and carried reel 120. In such a configuration, the activating cylinder 640 is a float-type cylinder with fluid which displaces responsively to movement of the flex arm 911 and cutter bar 910, but may not be controlled to control relative movement between the cutter bar 910 and the header frame 101. It should thus be appreciated that the exemplary embodiments of the present invention can be readily adapted to allow varying types of movements of the cutter bar, other than fore-to-aft movement, to control the position of the reel arm 123 and carried reel 120 to avoid the tines 121 of the reel 120 contacting the cutter bar.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
   a chassis; and
   a header carried by said chassis, said header including:
      a header frame;
      a cutter movably coupled to said header frame;
      a reel arm pivotably coupled to said header frame;
      a reel carried by said reel arm and including a plurality of tines;
      a variable displacement fluid cylinder including an interior chamber, a first piston linked to said reel arm placed within said interior chamber and a second piston placed within said interior chamber, said interior chamber defining a shared volume between said first piston and said second piston; and
      a piston driver linked to said cutter, said piston driver being configured to translate movement of said cutter relative to said header frame into displacement of said second piston within said interior chamber.

2. The agricultural vehicle according to claim 1, wherein said variable displacement fluid cylinder includes a force-transmitting fluid at least partially filling said shared volume and displacement of said second piston within said interior chamber displaces said first piston within said interior chamber.

3. The agricultural vehicle according to claim 1, further comprising an additional cylinder including a fluid chamber and a piston placed in said fluid chamber which is linked to said reel.

4. The agricultural vehicle according to claim 3, wherein said interior chamber of said cylinder defines a first piston volume on a side of said first piston opposite said shared volume, said additional cylinder having a port fluidly coupling said fluid chamber to said first piston volume of said interior chamber.

5. The agricultural vehicle according to claim 4, wherein said reel includes a first reel section linked to said first piston and a second reel section linked to said piston of said additional cylinder.

6. The agricultural vehicle according to claim 1, wherein said cutter is configured to move in a fore-to-aft direction relative to said header frame, said piston driver comprising a cam connected to said cutter such that said cam moves in the fore-to-aft direction with said cutter and a cam follower linked to said second piston and contacting said cam.

7. The agricultural vehicle according to claim 6, wherein said cam includes at least one surface which is angled with respect to the fore-to-aft direction, said cam follower contacting said at least one surface of said cam.

8. The agricultural vehicle according to claim 1, wherein said piston driver is an activating cylinder including an activating interior chamber with an activating piston linked to said cutter placed within said activating interior chamber.

9. The agricultural vehicle according to claim 8, wherein said interior chamber of said cylinder defines a second piston volume on a side of said second piston opposite said shared volume which is fluidly coupled to said activating interior chamber.

10. An agricultural vehicle, comprising:
    a chassis; and
    a header carried by said chassis, said header including:
       a header frame;
       a cutter movably coupled to said header frame;
       a reel arm pivotably coupled to said header frame;
       a reel carried by said reel arm and including a plurality of tines; and
       a variable displacement fluid cylinder including:
          a first piston linked to said reel arm;
          a second piston; and
          a shared volume of fluid between said first piston and said second piston, said second piston being linked to said cutter such that movement of said cutter relative to said header frame displaces said second piston and said first piston and causes pivoting of said reel arm.

11. The agricultural vehicle according to claim 10, further comprising an additional cylinder including a fluid chamber and a piston placed in said fluid chamber which is linked to said reel.

12. The agricultural vehicle according to claim 11, wherein said variable displacement fluid cylinder includes a first piston volume of fluid on a side of said first piston opposite said shared volume of fluid, said additional cylinder having a port fluidly coupling said fluid chamber to said first piston volume of fluid.

13. The agricultural vehicle according to claim 10, wherein said cutter is configured to move in a fore-to-aft direction relative to said header frame, said header further comprising a cam connected to said cutter such that said cam moves in the fore-to-aft direction with said cutter and a cam follower linked to said second piston and contacting said cam.

14. The agricultural vehicle according to claim 13, wherein said cam includes at least one surface which is angled with respect to the fore-to-aft direction, said follower contacting said at least one surface of said cam.

15. The agricultural vehicle according to claim 10, further comprising an activating cylinder including an activating interior chamber with an activating piston linked to said cutter placed within said activating interior chamber.

16. The agricultural vehicle according to claim 15, wherein said variable displacement fluid cylinder includes a second piston volume of fluid on a side of said second piston opposite said shared volume of fluid, said second piston being linked to said cutter by said second piston volume of fluid being fluidly coupled to said activating interior chamber.

17. A method of controlling a reel carried by a reel arm of an agricultural vehicle with respect to a position of a cutter, comprising:
controllably moving said cutter, said cutter moving causing a displacement of a second piston within a variable displacement fluid cylinder; and
displacing a first piston which is within said variable displacement fluid cylinder and is linked to said reel arm, said displacing being caused by a shared volume of fluid between said first piston and said second piston acting on said first piston responsively to said displacement of said second piston.

18. The method according to claim 17, wherein said second piston is connected to a cam follower, said cam follower being connected to a cam carried by said cutter.

19. The method according to claim 17, wherein said agricultural vehicle includes an activating cylinder which includes an activating interior chamber and an activating piston linked to said cutter placed within said activating interior chamber, said variable displacement fluid cylinder including a second piston volume of fluid which is on a side of said second piston opposite said shared volume of fluid and is fluidly coupled to said activating interior chamber.

20. The method according to claim 17, wherein said moving of said cutter occurs in a fore-to-aft direction.

* * * * *